United States Patent [19]

Lin et al.

[11] Patent Number: 4,887,914
[45] Date of Patent: Dec. 19, 1989

[54] AEROSTATIC BEARING WITH AN ADJUSTABLE STABILIZING STRUCTURE

[75] Inventors: Yuh-Wen Lin; Ying-Wen Jan, both of Hsin Chu, Taiwan

[73] Assignee: Industrial Technology Research Institute, Taiwan

[21] Appl. No.: 268,151

[22] Filed: Oct. 26, 1988

[51] Int. Cl.$^4$ .............................................. F16C 32/06
[52] U.S. Cl. ...................................... 394/12; 384/123; 384/399
[58] Field of Search ................. 384/12, 123, 399, 124, 384/121, 118, 369

[56] References Cited

U.S. PATENT DOCUMENTS

| | | | |
|---|---|---|---|
| 4,496,194 | 1/1985 | Phillips | 384/12 |
| 4,560,213 | 12/1985 | Enderle et al. | 384/12 |
| 4,690,572 | 9/1987 | Sasaki | 384/399 |
| 4,728,201 | 3/1988 | Abbe | 384/123 |

Primary Examiner—Lenard A. Footland
Attorney, Agent, or Firm—Cushman, Darby & Cushman

[57] ABSTRACT

An aerostatic bearing with an adjustable stabilizing structure suitable to be applied to a linear sliding rail of a precision test instrument or a precision tool machine, etc., comprises a bearing body with a round or other shaped planes. The plane is furnished with a pocket, a plurality of radial grooves, and a ring-shaped grooves, being in communication with one another. The outer edge of the bearing body is provides with an air intake extended, through an intake passsage, to an area nearing a pocket. The intake passage is in communication with the pocket through a first orifice. A spacing member with a second orifice is movably mounted in the intake passage so as to form a cavity between the two orifices. When the position of the spacing member is changed, the volume of the cavity is varied so as to adjust the bearing to a stable condition; furtherly, the second orifice is designed to be operated by a needle valve, therefore, the volume speed of the intake air through the second orifice can be adjusted to achieve for the best result.

4 Claims, 5 Drawing Sheets

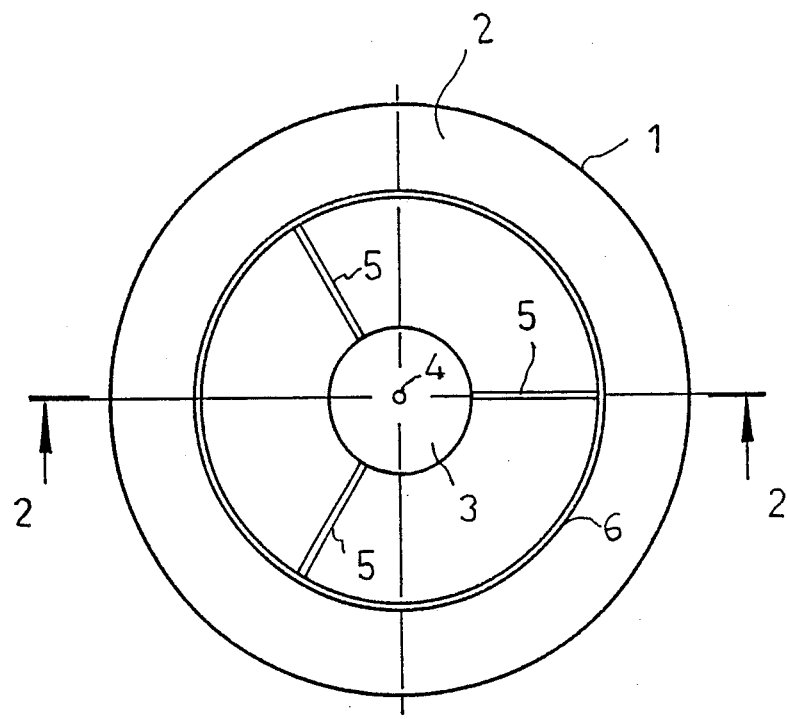
FIG·1
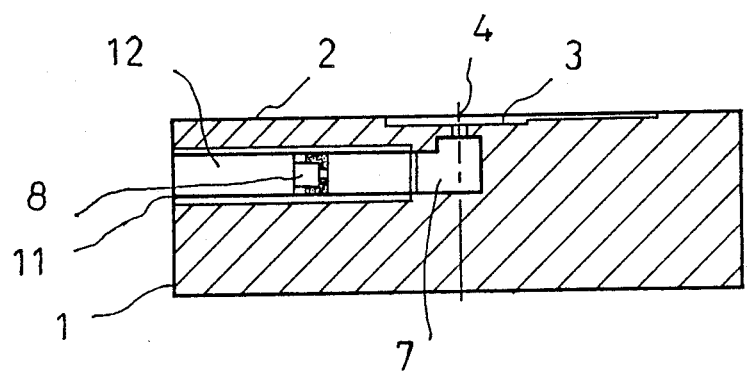
FIG·2

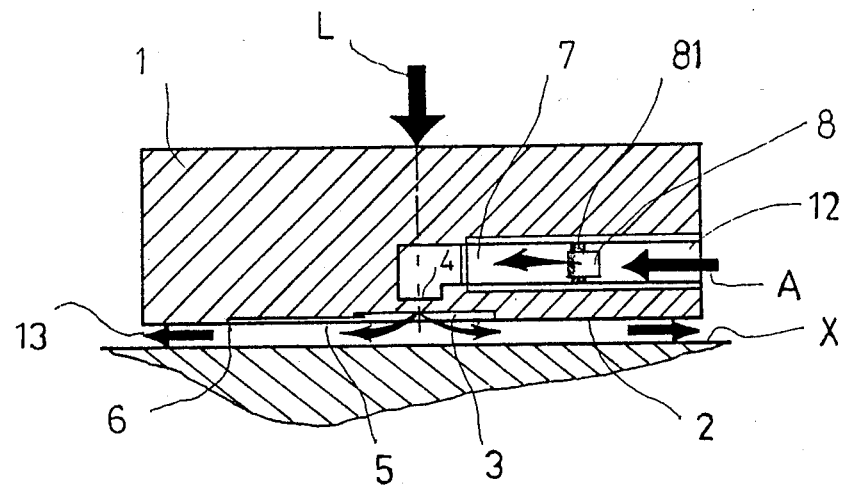
FIG·3
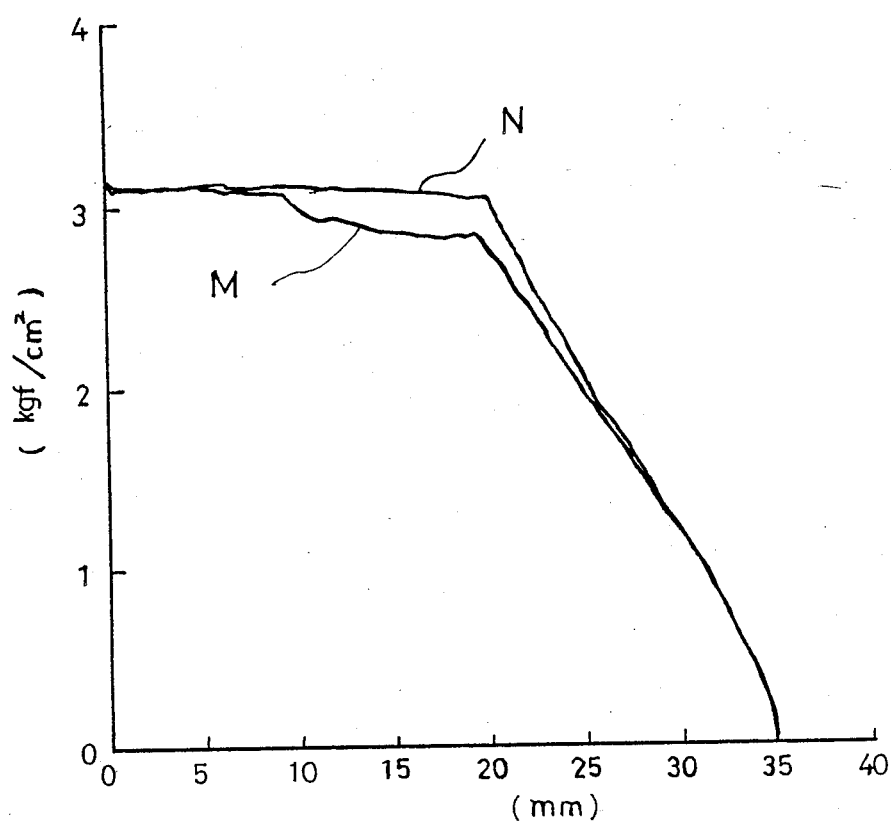
FIG·4

AEROSTATIC BEARING WITH AN ADJUSTABLE STABILIZING STRUCTURE

BACKGROUND OF THE INVENTION:

Since the aerostatic bearing is a bearing of none contact, having higher linear precision and without any vibration as usually caused by coarse surfaces of contact type of bearing, it has widely been used in various types of precision machines and test instruments. However, since the aerostatic bearing uses compressed air as fluid lubricant, an air hammer phenomenon in such a bearing is susceptible to rise; therefore, such air hammer effect has been an existing problem to be overcome in aerostatic bearing. Moreover, the rigidity and carrying capacity of an aerostatic bearing are important features to be considered during design, because of such features determine the function of a machine requiring high precision.

In the conventional aerostatic bearing, the rigidity and carrying capacity of the bearing are usually increased by elevating the air pressure or increasing the size of the pocket; unfortunately, to elevate the air pressure or to increase the size of the pocket would result in air hammer phenomenon, and therefore the problems to be solved are how to obtain a higher carrying capacity and rigidity so as to eliminate the air hammer phenomenon.

SUMMARY OF THE INVENTION:

The present invention provides a new aerostatic bearing structure without any air hammer phenomenon, and the new bearing structure can surely provide a machine with stable operation, a higher precision, and a higher carrying capacity and rigidity.

In the present invention, the novel radial grooves are used for replacing the large-sized pocket in the conventional air bearing structure so as to minimize the volume of the pocket and to eliminate the air hammer phenomenon without reducing the high carrying capacity and rigidity of the conventional bearing. Moreover, a spacing member is movably mounted in the intake passage of the bearing for adjusting the air volume therein so as to improve the dynamic characteristics of the bearing. The spacing member is fitted with a needle valve for regulating the air flow in the bearing so as to control the stability of the aerobearing more precisely.

BRIEF DESCRIPTION OF THE DRAWINGS:

FIG. 1 is the front view of a first embodiment of the present invention.

FIG. 2 is a sectional view of FIG. 1 along line 2—2.

FIG. 3 is a sectional view showing the function of the first embodiment.

FIG. 4 shows the comparison of a pressure distribution curves showing between the present invention and the prior art.

Figure 11:
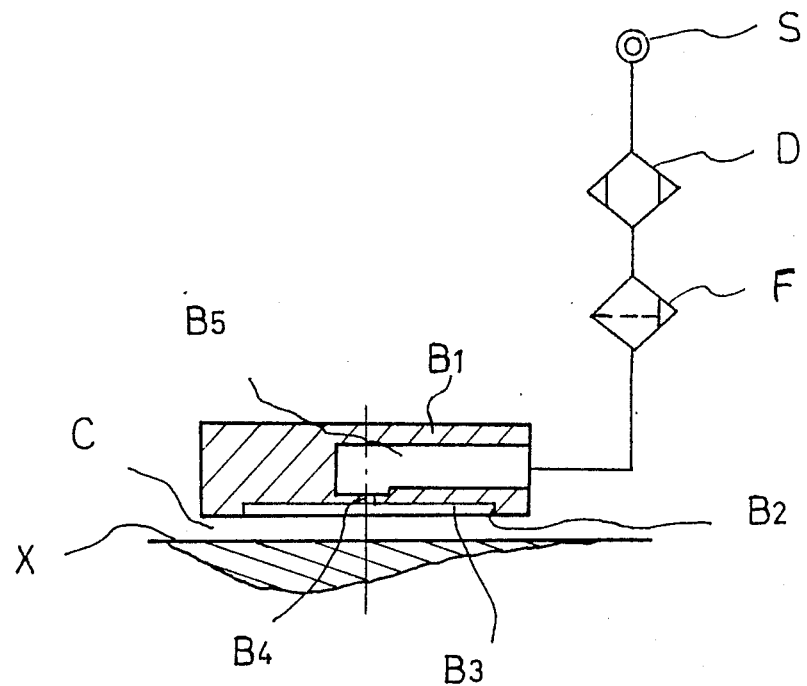
FIG. 11 illustrates a system view of a conventional aerostatic bearing.

DETAILED DESCRIPTION:

FIG. 11 illustrates a conventional aerostatic bearing system, in which the bearing body B1 has a bearing plane B2 with a pocket B3. In the center of the pocket B3, there is an orifice B4, being in communication with the intake passage B5 in the bearing body 1. The air can flow from an air source S to a pocket B3 through a dryer D, a filter F, then the intake passage B5, and the orifice B4.

The air will provide a pressure in the gap C between the plane B2 and the bearing surface X so as to form a bearing. When higher bearing capacity and rigidity are required, the volume of the pocket B3 or the air pressure has to be increased; however, the increment of the pocket and the air pressure would result in an air hammer phenomenon, which would reduce the precision and serviceable life of the bearing, or even the reliability of a whole machine.

FIG. 1 is a front view of a first embodiment of the present invention, which is an improved structure in view of the drawbacks of the conventional aerostatic bearing. On the bearing plane 2 of the bearing body 1, there is a pocket 3 with an orifice 4 and a plurality of radial groove 5 around the circumference of the pocket 3 for increasing the function area of the pocket. At the outer ends of the radial grooves 5, a ring-shaped groove 6 is furnished.

FIG. 2 is a sectional view of the first embodiment of the bearing. The bearing body 1 is furnished with an air intake 11 and a passage 12 to the orifice 4. A spacing member 8 is mounted inside the passage 12 in a screwing and adjustable manner; the ring member 8 has an orifice 81 so as to have the space between the spacing member 8 and the orifice 4 by the pocket formed into a cavity 7. As shown in FIG. 3, the air A entered the intake passage 12 will flow through the orifice 81 of the spacing member 8 to enter into the cavity 7 that provides a shock-absorbing function. After the air passing through the orifice 4, the air pressure will evenly spread in the pocket 3, the radial grooves 5, and the ring-shaped groove 6 to provide a pressure film so as to let the bearing body 1 carry the load L, which becomes floating over the bearing surface X, i.e., to provide an aerostatic bearing device without actual contact. The central pocket 3 according to the present invention is smaller in volume than that of the conventional air bearing; however, the total bearing area of the present invention including the pocket 3, the radial grooves 5, and the ring-shaped groove 6 is almost equal to that of the conventional air bearing. Since the volume of the whole pocket has been reduced, the air hammer phenomenon can be eliminated, and the serviceable life, the precision, and the reliability of the bearing and the machine thereof will be increased. Since the position of the spacing member 8 in the intake passage 12 is adjustable, the volume of the cavity 7 is also adjustable. By means of the spacing member 8 and the orifice 81 thereof, the cavity 7 provides air storage, pressure stabilizing, and shock absorbing functions, and to provide further stabilizing bearing function, which has been proved through repeated tests.

FIG. 4 illustrates the pressure distribution curves, showing the comparison between the present invention and the conventional air bearing under the conditions of a same size and a same air pressure. The pressure distribution curve M according to the present invention looks similar to the curve N of the conventional air bearing except the pressure in the ring-shaped groove being slightly lower. Since the grooves in the present invention are employed to replace a portion of the pocket in the conventional air bearing, the air hammer phenomenon has been reduced considerably; moreover, by means of the stabilizing effect provided by the ring member 8 and the cavity 7, the air hammer phenomenon has been eliminated without sacrificing the carrying capability and rigidity of the aerostatic bearing.

Figure 5:
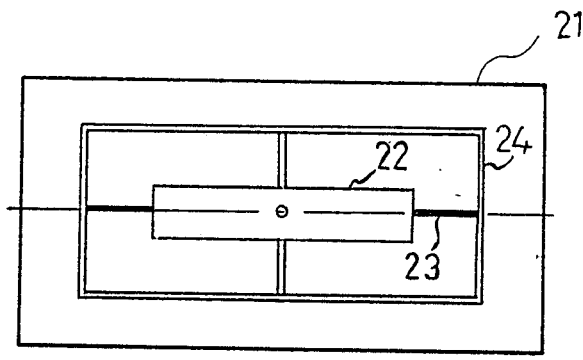
FIG. 5 is a front view of a second embodiment of the present invention.

FIG. 5 illustrates a front view of a second embodiment of the present invention, in which the bearing body, the pocket and the grooves may not be limited in a round shape, i.e., they may be in a rectangular or square shape, or other appropriate shapes; in other words, the shapes of the bearing body 21, the pocket 22, the radial grooves 23 and the ring-shaped groove 24 may be varied in accordance with the actual requirement.

Figure 6:
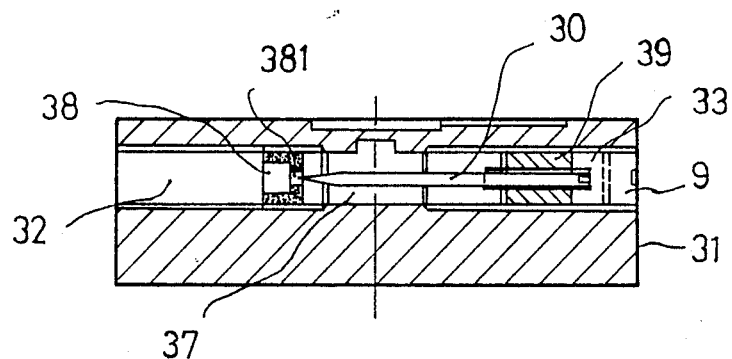
FIG. 6 is a sectional view a third embodiment of the present invention.

FIG. 6 is a sectional view of a third embodiment of the present invention, which is a further improvement of the orifice of the spacing member in the aforesaid embodiments so as to regulate the flowing volume of air in a more precise manner. Since the structure of the pocket and the grooves of the third embodiment are the same as that of the first or second embodiments, no such details will be described here. At the opposite end of the intake passage 32, there is a through hole 33 on the bearing body 31 being in communication with the cavity 37. There is a plug 39 being mounted in the through hole 33 with threads in an axially adjustable manner, so as to adjust the volume of the cavity 37. The plug 39 is mounted with an adjustable needle valve 30, and the conic end of the needle valve 30 may be inserted into or moved out of the orifice 381 on the ring member 38 so as to change the cross sectional area of the orifice 381.

Figure 7:
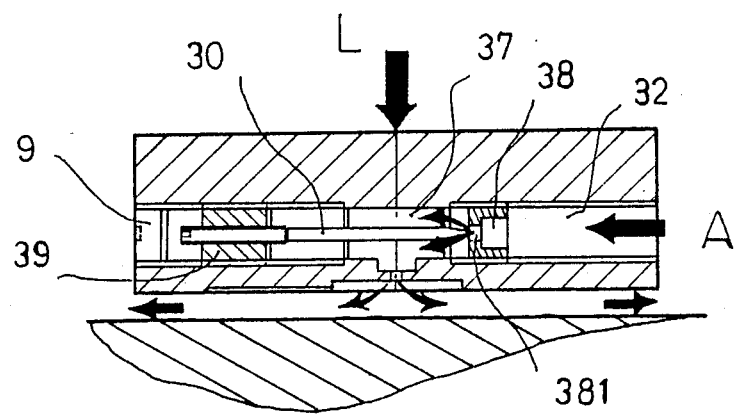
FIG. 7 is a sectional view showing the function of the third embodiment.

FIG. 7 illustrates the function of the third embodiment. The ring member 38 is first adjusted at a given position ; the needle valve 30 is set at a position separated from the ring member 38, then the air A will enter into the passage 32 to flow through the orifice the operator may adjust the plug 39 to vary the volume of the cavity 37 until the bearing being set at a steady condition; the needle valve 30 is then adjusted to vary the flow of air so as to control the stability of the aero bearing more precisely. Finally, the through hole 371 may be closed with a cap 9.

Figure 8:
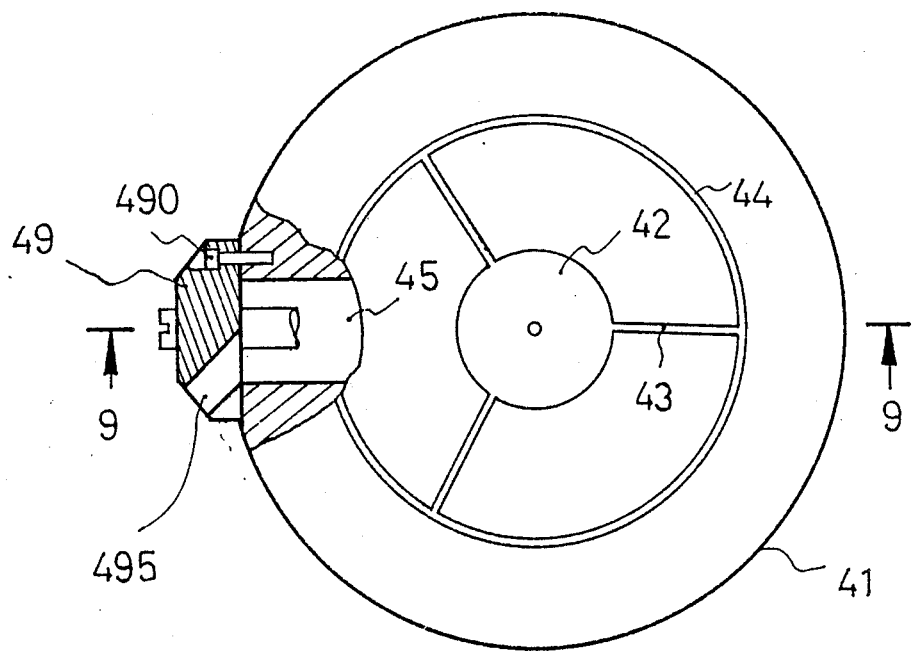
FIG. 8 is a front view of a fourth embodiment of the present invention.
Figure 9:
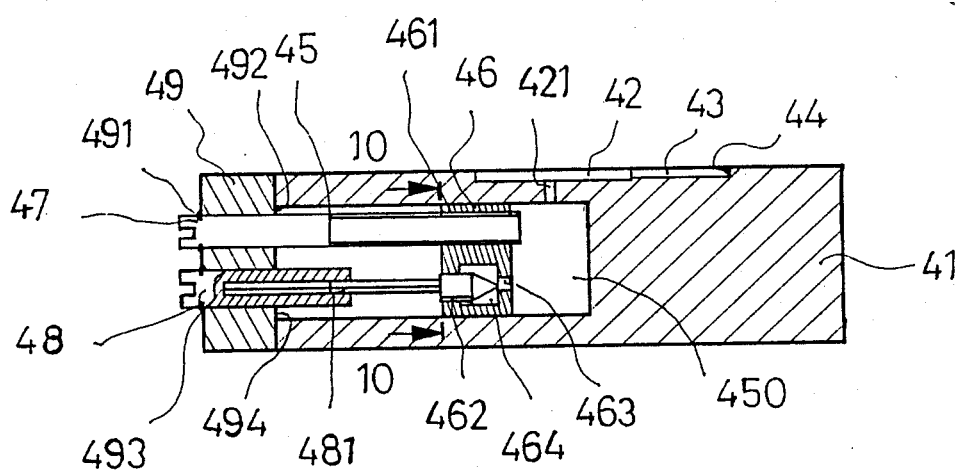
FIG. 9 is a sectional view of FIG. 8 along line 9—9.
Figure 10:
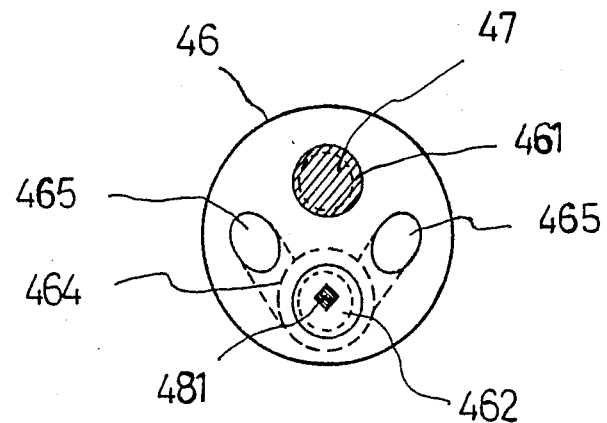
FIG. 10 is a sectional view of FIG. 9 along line 10—10.

FIG. 8 is a front view of a fourth embodiment of the present invention. FIG. 9 is a sectional view of FIG. 8 along line 9—9. FIG. 10 is a sectional view of FIG. 9 along line 10—10. The front side of the fourth embodiment has the same structure, such as a pocket 42, radial grooves 43 and ring-shaped groove 44, as those in the first or second embodiments. The bearing body 41 is furnished with an intake passage 45, in which an adjustable spacing member 46 is mounted; the spacing member 46 has a threaded hole 461 for receiving a screw bolt 47 so as to drive the spacing member 46 to move. One end of the screw bolt 47 is rotatably mounted in a hole on a Lid member 49, but restricted axial motion there between by retaining rings 491 and 492. Lid member 49 is fixedly mounted to the bearing body 41 with screws 490; as a result, the screw bolt 47 can drive the spacing member 46 to move back or forth so as to vary the volume of the cavity 450 between the orifices 421 and 363 of the pocket 42 and the spacing member 8 respectively. The Lid member 49 has another through hole for mounting a rotatably rod 48, which is limited in place and prevented from moving axially by means of retaining rings 493 and 494. One end of the rod 48 inside the passage 45 is connected with a needle valve 481 that can be axially slid but restricted rotation related to the rod 48. This can be done such as by rod 48 furnished with a square hole to fit a square-shaped stud of the needle valve 481. One end of the needle valve 481 is furnished with threads and is to fit with another threaded hole 462 of the spacing member 46. When the needle valve being rotated, the conic end of the needle valve 481 can be moved near or away from an orifice 463 in the spacing member 46 so as to regulate the flow of air. The threaded hole 462 in the spacing member 46 and the orifice 463 are furnished co-axially with a space between them so as to form into a cavity 464 for receiving the conic end of the needle valve 481. At one side of the threaded hole 462, there are intake passage 465 (as shown in FIG. 10) being in communication with the cavity 464. The Lid member 49 has another intake port 495 being in communication with the passage 45 so as to let air flow into cavity 450 through the intake port 495, the passage 45 and 465 and the orifice 463; finally, the air will flow through the orifice 421 to the pocket 42 and the grooves 43 and 44 to provide a bearing function. O-rings are mounted between the spacing member 46 and the passage 45, and also between the screw bolt 47, the adjustable rod 48 and the lid member 49 respectively as sealing members to prevent from air-leaking.

In operation, the volume of the cavity 450 may be adjusted by moving the position of the spacing member 46 when rotating the screw bolt 47; at the same time, the needle valve 481 may be slid freely within the rod 48 without affecting the relative position between the needle valve 481 and the orifice 463. If there is still a slight unstable condition, after the volume of the cavity being adjusted, the rod 48 may be rotated so as to move the needle valve 481 for adjusting the flow of the orifice 463.

We claim:

1. An aerostatic bearing with an adjustable stabilizing structure comprising a bearing body having a plane, said plane being furnished with a pocket and a first orifice being in communication with an intake passage furnished in said body; a movable spacing member with a second orifice being mounted, inside said passage, whereby a cavity being formed in said passage between said first orifice and said second orifice for regulating the intake velocity and the air volume, and said plane being furnished with a ring-shaped groove around said pocket and a plurality of radial grooves being connected between said pocket and said ring-shaped groove so as to increase the working area said pocket and to reduce the total volume of the same.

2. An aerostatic bearing as claimed in claim 1, wherein said second orifice is mounted with a needle valve for varying the cross sectional area of said second orifice.

3. An aerostatic bearing as claimed in claim 2, wherein said needle valve is mounted in the opposite side of said intake passage; and being moved by using threaded means so as to adjust the position thereof relative to said second orifice.

4. An aerostatic bearing as claimed in claim 2, wherein said needle valve is installed at the same side of said intake passage, and fitted with said spacing member by using threaded means so as to adjust the position of said needle valve relative to said second orifice; a Lip member with an intake port being mounted at the opening portion of said intake passage which is in communication with said intake port; said Lip member being mounted with a screw bolt and a rod which are rotatable but not moved axially therein; said screw bolt and said spacing member being connected together with threads so as to have said spacing member moved back or forth; by rotating said screw bolt said adjustable rod and said needle valve being slid axially and rotated together, therefore the movement of said spacing member would not affect the relative position between said needle valve and said second orifice, i.e., said relative position being only changed upon rotating said rod.

* * * * *